United States Patent
Tortora

(10) Patent No.: US 11,340,557 B2
(45) Date of Patent: May 24, 2022

(54) MOVING INDICATOR FOR AN ANALOGUE DISPLAY DEVICE

(71) Applicant: The Swatch Group Research and Development Ltd, Marin (CH)

(72) Inventor: Pierpasquale Tortora, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 17/091,163

(22) Filed: Nov. 6, 2020

(65) Prior Publication Data

US 2021/0200155 A1    Jul. 1, 2021

(30) Foreign Application Priority Data

Dec. 31, 2019  (EP) ..................... 19220169

(51) Int. Cl.
*G04B 19/32* (2006.01)
*F21V 8/00* (2006.01)

(52) U.S. Cl.
CPC ........... *G04B 19/32* (2013.01); *G02B 6/0003* (2013.01); *G02B 6/0011* (2013.01); *G02B 6/0051* (2013.01)

(58) Field of Classification Search
CPC .... G04B 19/32; G02B 6/0003; G02B 6/0011; G02B 6/0051
See application file for complete search history.

(56) References Cited

U.S. PATENT DOCUMENTS

2013/0083508 A1   4/2013 Murata et al.

FOREIGN PATENT DOCUMENTS

| CH | 714995 B1 | * | 11/2019 | ............ G04B 37/02 |
|---|---|---|---|---|
| CN | 1424632 A | * | 6/2003 | ........... G04B 19/042 |
| DE | 33 00 270 A1 | | 7/1984 | |
| DE | 3300270 A1 | * | 7/1984 | ............ G01D 13/28 |
| DE | 10 2012 004 100 A1 | | 9/2012 | |
| DE | 102012004100 A1 | * | 9/2012 | ........... G01D 13/265 |
| EP | 1319998 A1 | * | 6/2003 | ........... G04B 19/305 |
| ER | 1 319 998 A1 | | 6/2003 | |
| FR | 2 670 287 A1 | | 6/1992 | |
| JP | 04-174322 A | | 6/1992 | |
| JP | 2009-156775 A | | 7/2009 | |

(Continued)

OTHER PUBLICATIONS

European Search Report for Corresponding EP 19 22 0169, dated Jun. 24, 2020.

(Continued)

*Primary Examiner* — Mary Ellen Bowman
(74) *Attorney, Agent, or Firm* — Sughrue Mion, PLLC

(57) ABSTRACT

A moving indicator for an analogue display device, in particular for a timepiece. The indicator includes a multi-layer part including an opaque metal layer and a transparent light guide layer and forming a body and a head of the indicator. The head is centred relative to a rotational axis of the indicator and arranged to receive a luminous flux on the bottom face thereof. A fluorescent material is arranged on the transparent light guide layer at the head of the indicator to absorb at least part of said luminous flux and to re-emit a second luminous fluorescence flux in the transparent light guide layer. Other aspects comprise a set of indicators, a display device and a watch comprising one or more moving indicators.

12 Claims, 1 Drawing Sheet

(56) References Cited

FOREIGN PATENT DOCUMENTS

| | | |
|---|---|---|
| JP | 2013-76639 A | 4/2013 |
| JP | 2015-81873 A | 4/2015 |
| JP | 2018-40698 A | 3/2018 |

OTHER PUBLICATIONS

Office Action dated Feb. 15, 2022 from the China National Intellectual Property Administration in CN application No. 202011629024.5.

* cited by examiner

MOVING INDICATOR FOR AN ANALOGUE DISPLAY DEVICE

CROSS REFERENCE TO RELATED APPLICATIONS

This application claims priority to European Patent Application No. 19220169.7 filed Dec. 31, 2019, the entire contents of which are incorporated herein by reference

TECHNICAL FIELD

The invention relates to a moving indicator (for example a hand) for an analogue display device, in particular in a timepiece. The invention further relates to a set of indicators comprising a plurality of moving indicators. Other aspects of the invention relate to a display device for a timepiece comprising said indicators in addition to a watch comprising said display device.

TECHNOLOGICAL BACKGROUND

The European patent document EP 2950166 relates to a set of luminous display hands for a portable object, the portable object comprising a frame housing an electrical power source that comprises a first and a second terminal. The set of luminous display hands comprises at least a first and a second luminous display hand made of an electrically non-conductive material and in which a hole is arranged for the passage of a drive arbor. The drive arbor of the second luminous display hand is disposed concentrically inside the drive arbor of the first luminous display hand. Each of the first and second luminous display hands bears a first, respectively a second light source which emits light. The first and second light sources each comprise a first and a second pole. Depending on whether the light sources are mounted in parallel or in series, the first pole or the second pole of the second light source is connected to the first pole of the first light source by contact between the first and the second luminous hands.

The European patent document EP 2950168 relates to a set of luminous display hands for a portable object housing an electrical power source. The set of luminous display hands comprises at least a first and a second superimposed luminous display hand, each provided with a hole for the passage of a drive arbor. The drive arbor of the second luminous display hand is disposed concentrically inside the drive arbor of the first hand with insertion of an isolating layer between the two drive arbors. Each of the first and second luminous display hands bears a first, respectively a second light source. The first and second light sources each comprise a first and a second pole, the first pole of the first light source being electrically connected to a first terminal of the power source via the drive arbor of the first luminous display hand, the second pole of the first light source being connected to the first pole of the second light source via a contact piece which ensures electrical continuity between the first and the second luminous display hands. The second pole of the second light source is connected to the second terminal of the power source via the drive arbor of the second luminous display hand.

In these two examples, the electrical power supply of the light sources is ensured by sliding contacts between the drive arbors of the hands and between the battery and the gears of the movement. The main drawback of this solution, in particular for watches, is the mechanical overload caused by the friction of the electrical contacts, which can result in permanent energy losses in the order of 12%. These frictions can furthermore cause the watch to lose accuracy, and can also result in uncontrolled wear of the contacts.

GENERAL DESCRIPTION OF THE INVENTION

A first aspect of the invention relates to a moving indicator for an analogue display device, in particular for a timepiece. The indicator comprises a multi-layer part including an opaque metal layer and a transparent light guide layer. The part forms a body and a head of the indicator. The head is centred relative to a rotational axis of the indicator and arranged to receive a luminous flux on the bottom face thereof. A fluorescent material is arranged on the transparent light guide layer at the head of the indicator to absorb at least part of said luminous flux and to re-emit a second luminous fluorescence flux in the transparent light guide layer.

When in use, the moving indicator is arranged such that the opaque metal layer of the multi-layer part is on the side nearest the observer. The opaque layer, that is for example metallic can be made in the form of a metal sheet (typically having a thickness of 0.12 mm) and which can be directly seen by the observer or concealed by a decorative layer arranged thereon (for example arranged by printing, diamond polishing, PVD colouring, electro-plating or coloured lacquering). Conversely, the transparent light guide layer will be situated, when in use, beneath the opaque metal layer and will thus not be visible to the observer. The term "bottom face" is understood to mean the opposite face thus concealed from the observer when the moving indicator is in use.

The term "fluorescent material" is understood to mean a material comprising fluorescent molecules, i.e. with the ability to absorb an incident luminous flux (excitation light) and deliver same in the form of a luminous fluorescence flux (emission light). Once the energy of the photon has been absorbed, the molecule is thus generally in an electronic and excited vibrational state. Relaxation of the excited vibrational states occurs before a fluorescent light is emitted (having a longer wavelength than the excitation light). The luminous fluorescence flux is generally emitted in an isotropic manner.

The solution proposed by the first aspect of the invention will be appreciated in that it overcomes the need for physical contacts, in particular frictions, between the moving indicator and the stationary underlying structure comprising a device for emitting a luminous flux. More specifically, the fluorescent material is excited remotely, without physical contact, by the incident luminous flux.

Moreover, unlike known techniques for coupling the light in a guide from a vertical direction according to which micro-prisms or diffraction gratings are machined on the surface of the guide, which techniques are complicated and expensive to implement, the layer of fluorescent material can be easily deposited by any method (spraying, dispensing, inkjet printing) and does not require orientation to deviate the light along the axis of the hand, which is necessary for prisms and diffraction gratings.

Another advantage of the solution proposed by the invention is that, from the same primary source, and by selecting a determined pigment type, a fluorescence can be generated in a chosen colour, which cannot occur with coupling structures using prisms and diffraction gratings, which are limited to deviating the light originating from a primary source and thus the colour whereof is that of the source.

The transparent light guide layer can produce a total internal reflection of the luminous rays of the second luminous flux and thus a propagation that is substantially perpendicular to said rotational axis.

The multi-layer part can comprise an optical isolation layer between the opaque metal layer and the transparent light guide layer. The term "optical isolation layer" is understood to mean a layer promoting total internal reflections of a light flux propagating in the transparent light guide layer compared to the situation wherein the transparent light guide layer is in direct contact with the opaque metal layer. The difference $\Delta n$ between the refractive index of the optical isolation layer and the refractive index of the transparent light guide layer can lie in the interval 0.5 to 0.9, preferably in the interval 0.55 to 0.8, more preferably in the interval 0.6 to 0.75.

The optical isolation layer can have a thickness that lies in the interval 2 µm to 15 µm, preferably in the interval 3 µm to 12 µm, more preferably in the interval 5 µm to 10 µm.

The structure of the above indicator will be appreciated in that it is easy to manufacture using methods known in the art. For example, the plurality of layers of the part can firstly be deposited then stamped or cut to form the indicator. On the other hand, no assembly, bonding or micro-handling operation is necessary to arrange the layers of the part.

The part can be flat and the top and bottom faces thereof can be planar. According to an alternative embodiment, the top face can be non-planar.

The head can include a central hole wherein a sleeve made of an opaque material can optionally be arranged. The sleeve can be formed separately from the part or be integral therewith. According to one embodiment, the sleeve can be integral with the opaque metal layer.

The indicator can be a hand, for example a hand for a watch.

A second aspect of the invention relates to a set of indicators comprising at least a first indicator and a second indicator (optionally being hands), each being as described hereinabove, with a head including a central hole wherein a sleeve made of an opaque material is arranged. The first indicator comprises one or more secondary holes arranged about the central hole of the head so as to allow said luminous flux to pass through the first indicator through the secondary holes so that at least part of said flux is absorbed by the fluorescent material of the second indicator when the first indicator and the second indicator are arranged such that the rotational axes thereof are aligned.

A third aspect of the invention relates to a display device for a timepiece. The device comprises:
a dial;
indicators such as those described hereinabove, disposed above the dial, the respective heads of the indicators being superimposed and fastened to respective arbors in order to rotate about a shared rotational axis; and
a stationary lighting source arranged to illuminate beneath all of the heads of the indicators by means of a luminous flux substantially parallel to the shared rotational axis and having a shorter wavelength than the wavelength re-emitted by the fluorescent material.

The stationary lighting source can include electroluminescent diodes and/or organic electroluminescent diodes which are distributed about said arbors and mounted on a printed circuit component disposed beneath the dial.

A fourth aspect of the invention relates to a watch comprising a display device as described hereinabove, wherein the indicators are hands.

BRIEF DESCRIPTION OF THE FIGURES

Other features and characteristics of the invention will be better understood upon reading the detailed description of certain advantageous embodiments presented below for illustration purposes, with reference to the accompanying drawings which show.

DETAILED DESCRIPTION OF SEVERAL EMBODIMENTS OF THE INVENTION

Figure 1:
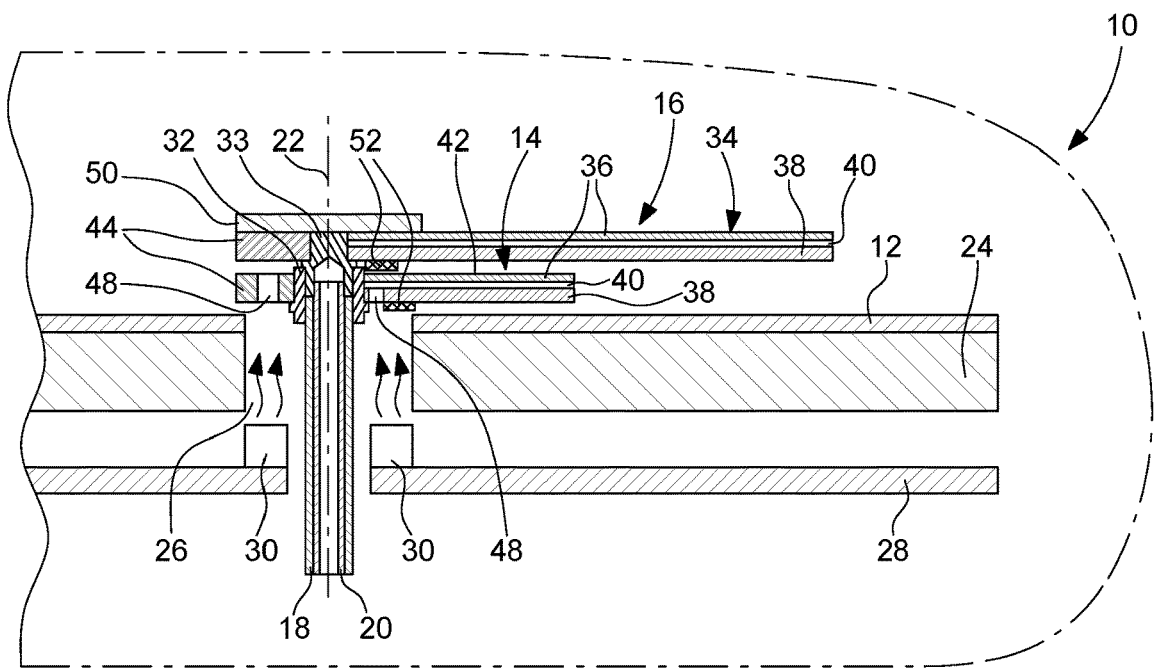
FIG. 1: a diagrammatic vertical sectional view of an analogue time display device using luminous hands according to one embodiment of the invention, in a watch.

FIG. 1 diagrammatically illustrates the outer contour of a case of a wristwatch 10 provided with a time display device comprising in particular a dial 12, an hour hand 14 and a minute hand 16, these hands being fastened to respective coaxial arbors 18, 20 driven by a horological movement (not shown). The coaxial arbors 18, 20 allow the hands 14, 16 to be rotated about a shared rotational axis 22. The dial 12 is placed on a dial support 24 and these two components include a central orifice 26 which extends about the arbors 18, 20. Beneath the support 24 is located a printed circuit board 28 bearing a light source 30 to produce a light beam that is directed (essentially) axially, i.e. essentially parallel to the rotational axis 22. The light source 30 is formed by a plurality of electroluminescent diodes (LEDs) which are distributed about the arbors 18, 20 and mounted on the printed circuit board 28. The diodes are preferably distributed uniformly about the axis, for example three diodes separated from one another by 120°. Alternatively or additionally, the light source could include either organic electroluminescent diodes (OLEDs) or miniature laser sources, for example of the vertical-cavity surface-emitting laser (VCSEL) type. In other embodiments, light sources of an elongate shape or even an annular shape can be used to ensure optimal uniformity of the light intensity about the axis 22. The diodes can all be lit at the same time or not depending on the desired aesthetic effects, activated by means of a manual member such as a push button of the watch and/or by a light sensor. For aesthetic or ludic reasons, only lighting up certain diodes for example could be considered, for example only lighting up the minute hand, for example to indicate information that differs from the time (date or other information).

The light source 30 can be powered by the batteries of the watch. The diodes can emit a direct invisible light, such as in the ultraviolet range, in order to limit the negative aesthetic impact in the event of a leak about the axis of the hands. The UVs are then reconverted in the fluorescent material into a visible light.

The horological movement can be of any type. If it is electronic, it can be mounted either on the bottom face of the printed circuit board 28, or another board situated thereunder.

The hands 14, 16 are intended to be internally lit by the light source 30 to make the time easier to read and in particular to make this possible in the dark. The fact that the surface on the side nearest the user is opaque procures a standard appearance of the hand with all usual and known finishes. The invention thus does not result in aesthetic limitations and in particular the appearance in daylight is not affected by the invention.

Figure 2:
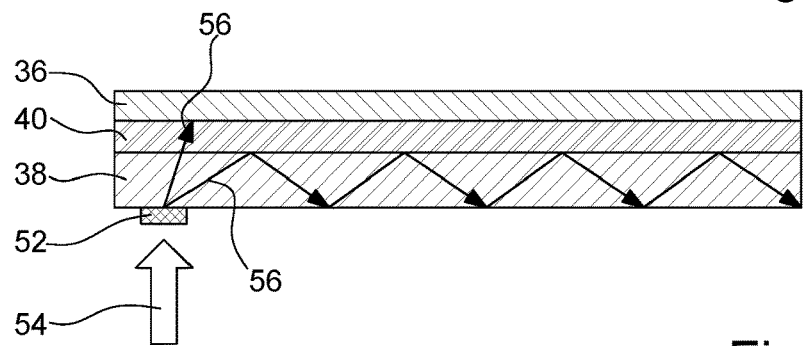
FIG. 2: a diagrammatic vertical sectional view of a hand according to one embodiment of the invention.
Figure 3:
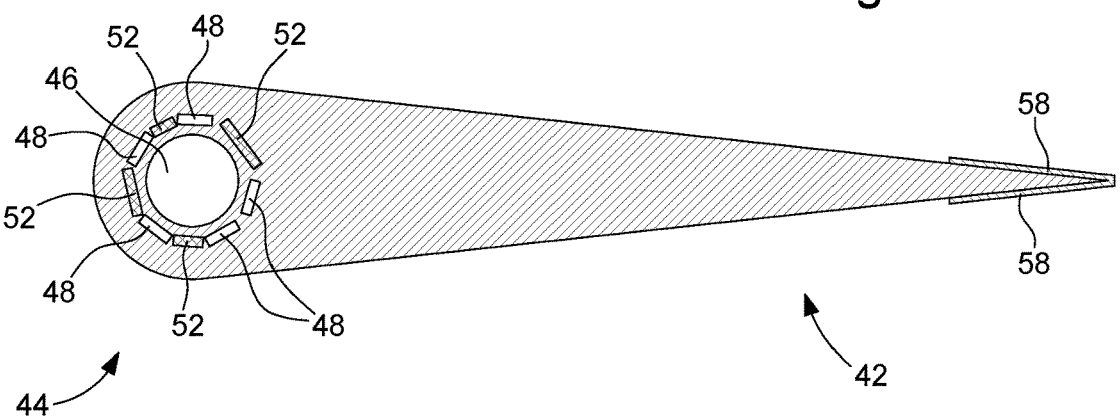
FIG. 3: a perspective view of the hand according to one embodiment of the invention.

With reference to FIG. 1-3, the hour hand 14 and minute hand 16 each include a central metal sleeve 32, 33 (not shown in FIG. 2, 3) and a part 34 having a plurality of layers including an opaque metal layer 36, a transparent light guide layer 38 and an optical isolation layer 40 between the opaque metal layer 36 and the transparent light guide layer 38. The part 34 forms an elongate body 42 and a circular head 44, the head 44 having a central hole 46 in which the sleeve 32, 33 is arranged. The sleeves 32, 33 can be integral with the part, or optionally integral with the opaque metal layer 36. The part 34 can be manufactured by conventional manufacturing means (for example the layers of the part can firstly be deposited then stamped or cut to form the hand). The part 34 is fastened to the corresponding arbor 18, 20 in a conventional manner. The body 42 of the hand preferably has a triangular or trapezoidal shape in plan view, however other shapes are possible depending on the needs.

Conventionally, in a watch, the hour hand 14 is mounted beneath the minute hand 16. In order to allow light originating from the light source 30 to travel in the direction of the minute hand 16, the circular head 44 of the hour hand 14 differs from that of the minute hand 16, inter alia, in that the circular head 44 of the hour hand 14 comprises secondary holes 48 arranged about the central hole 46. This allows the luminous flux to pass through the hour hand 14 through the secondary holes 48 and thus allows at least part of the flux to reach the bottom face of the minute hand 16. The elongate body 42 of the minute hand 16 is conventionally longer than the elongate body 42 of the hour hand 14. However, the respective heads thereof generally have the same size. The head 44 of the minute hand 16 is preferably covered by an opaque cover 50. Heads of different dimensions can also be used, allowing the LEDs to be arranged (for example in concentric circles) such that they favour the illumination of one or the other hand without mechanical interference.

The bottom face of the transparent light guide layer 38 comprises one or more deposits of fluorescent material 52, facing the light source 30 via the central orifice 26 and optionally also via the secondary holes 48, so as to establish optical contact with the transparent light guide layer 38 (for example the fluorescent material 52 can be formed by fluorescent pigments incorporated into an adhesive). Alternatively, the fluorescent material can be incorporated into the light guide layer. When in operation, the light source 30 illuminates the fluorescent material 52 with a luminous flux 54 having a wavelength that is shorter than the wavelength that will be re-emitted by the fluorescent material 52. The fluorescent material 52 absorbs this incident light and re-emits same 56 in an isotropic manner, in particular in the transparent light guide layer 38. The presence of the optical isolation layer 40 allows for total internal reflection of the fluorescent light propagating in the light guide layer and thus prevents gradual absorption in the metal layer. The Δn between the refractive index thereof and the refractive index of the transparent light guide layer lies in the interval 0.5 to 0.9, preferably in the interval 0.55 to 0.8, more preferably in the interval 0.6 to 0.75, and allows the value of the critical angle to be increased and thus the numerical aperture of the light guide layer in order to maximise the coupling of the fluorescent light. It should be noted that the presence of the isolation layer allows for the no-loss transmission in the guide layer once the light has been coupled and the index of the isolating layer influences the quantity of light coupled. The optical isolation layer can have a thickness that lies in the interval 2 μm to 15 μm, preferably in the interval 3 μm to 12 μm, more preferably in the interval 5 μm to 10 μm. A multitude of total internal reflections in the transparent light guide layer 38 then follow until reaching an end of the elongate body 42 where the luminous flux is transmitted outwards.

A light diffusion area 58 (for example made by a resin deposit) can be added to the apex of the hand, extending beyond (i.e. projecting from) the opaque metal layer 36 to facilitate the escape of the luminous flux and obtain a decorative pattern on said apex. The surface of the light diffusion area 58 can have a mat or rough finish. In other embodiments, not only the apex of the hand but also the edges of the elongate body 42 (and optionally the head) comprise a light diffusion area 58.

It goes without saying that the LED light sources can be placed in a different position to that close to the rotational axis and an optical coupler can be added to carry the luminous flux to the appropriate location to excite the fluorescent material of the hands.

It is clear that a hand produced according to the principles of the present invention can also be used as a single hand of any indicator, for example on the dashboard of a motor vehicle.

Although specific embodiments have been described in detail, a person skilled in the art will know that various modifications and alternatives to the above can be developed in light of the general teachings of the present disclosure of the invention. As a result, the specific arrangements and/or methods described herein are intended for illustration purposes only and are not intended to limit the scope of the invention.

The invention claimed is:

1. A moving indicator for an analogue display device, in particular for a timepiece, comprising a multi-layer part including an opaque metal layer and a transparent light guide layer and forming a body and a head of the indicator, said head being centred relative to a rotational axis of the indicator and arranged to receive a luminous flux on the bottom face thereof, wherein a fluorescent material is arranged on or in the transparent light guide layer at the head of the indicator to absorb at least part of said luminous flux and to re-emit a second luminous fluorescence flux in the transparent light guide layer.

2. The indicator according to claim 1, wherein the transparent light guide layer produces a total internal reflection of the luminous rays of the second luminous flux substantially perpendicular to said rotational axis.

3. The indicator according to claim 1, wherein the multi-layer part comprises an optical isolation layer between the opaque metal layer and the transparent light guide layer, the Δn between the refractive index of the optical isolation layer and the refractive index of the transparent light guide layer lying in the interval 0.5 to 0.9, preferably in the interval 0.55 to 0.8, more preferably in the interval 0.6 to 0.75.

4. The indicator according to claim 3, the optical isolation layer having a thickness that lies in the interval 2 μm to 15 μm, preferably in the interval 3 μm to 12 μm, more preferably in the interval 5 μm to 10 μm.

5. The indicator according to claim 1, wherein the plurality of layers of the part are firstly deposited then stamped or cut to form the indicator.

6. The indicator according to claim 1, wherein the part is flat, the top and bottom faces thereof being planar.

7. The indicator according to claim 1, wherein said head includes a central hole wherein a sleeve made of an opaque material is arranged.

8. The indicator according to claim 1, the indicator being a hand.

9. A set of indicators comprising at least a first indicator and a second indicator,
wherein said first and second indicators comprise a multi-layer part including an opaque metal layer and a transparent light guide layer and forming a body and a head of the indicator, said head being centred relative to a rotational axis of the indicator and arranged to receive a luminous flux on the bottom face thereof, wherein a fluorescent material is arranged on or in the transparent light guide layer at the head of the indicator to absorb at least part of said luminous flux and to re-emit a second luminous fluorescence flux in the transparent light guide layer wherein said head includes a central hole wherein a sleeve made of an opaque material is arranged, and wherein said first indicator comprises one or more secondary holes arranged about the central hole of the head so as to allow said luminous flux to pass through the first indicator through the secondary holes so that at least part of said flux is absorbed by the fluorescent material of the second indicator when the first indicator and the second indicator are arranged such that the rotational axes of the first indicator and of the second indicator are aligned.

10. A display device for a timepiece, the device comprising:

a dial;

indicators, comprising a multi-layer part including an opaque metal layer and a transparent light guide layer and forming a body and a head of the indicator, said head being centred relative to a rotational axis of the indicator and arranged to receive a luminous flux on the bottom face thereof, wherein a fluorescent material is arranged on or in the transparent light guide layer at the head of the indicator to absorb at least part of said luminous flux and to re-emit a second luminous fluorescence flux in the transparent light guide layer, said indicators being disposed above the dial, the respective heads of the indicators being superimposed and fastened to respective arbors in order to rotate about a shared rotational axis; and a stationary lighting source arranged to illuminate beneath all of the heads of the indicators by means of a luminous flux substantially parallel to the shared rotational axis and having a shorter wavelength than the wavelength re-emitted by the fluorescent material.

11. The device according to claim 10, wherein the stationary lighting source includes electroluminescent diodes and/or organic electroluminescent diodes and/or miniature laser sources of the VCSEL type which are distributed about said arbors and mounted on a printed circuit component disposed beneath the dial.

12. A watch comprising a display device said display device comprising:

a dial;

indicators, comprising a multi-layer part including an opaque metal layer and a transparent light guide layer and forming a body and a head of the indicator, said head being centred relative to a rotational axis of the indicator and arranged to receive a luminous flux on the bottom face thereof, wherein a fluorescent material is arranged on or in the transparent light guide layer at the head of the indicator to absorb at least part of said luminous flux and to re-emit a second luminous fluorescence flux in the transparent light guide layer, said indicators being disposed above the dial, the respective heads of the indicators being superimposed and fastened to respective arbors in order to rotate about a shared rotational axis; and a stationary lighting source arranged to illuminate beneath all of the heads of the indicators by means of a luminous flux substantially parallel to the shared rotational axis and having a shorter wavelength than the wavelength re-emitted by the fluorescent material, said indicators being hands.

* * * * *

UNITED STATES PATENT AND TRADEMARK OFFICE
CERTIFICATE OF CORRECTION

PATENT NO. : 11,340,557 B2
APPLICATION NO. : 17/091163
DATED : May 24, 2022
INVENTOR(S) : Pierpasquale Tortora Page 1 of 1

It is certified that error appears in the above-identified patent and that said Letters Patent is hereby corrected as shown below:

In the Claims

Column 7, Line 9; In Claim 9, after "layer", insert --,--

Column 7, Line 12; In Claim 9, before "wherein", delete "and"

Column 9, Line 11; In Claim 9, after "arranged,", insert --and--

Signed and Sealed this
Sixth Day of September, 2022

Katherine Kelly Vidal
*Director of the United States Patent and Trademark Office*